United States Patent
Sugawara et al.

(10) Patent No.: US 8,370,356 B2
(45) Date of Patent: Feb. 5, 2013

(54) MUSIC SEARCH SYSTEM, MUSIC SEARCH METHOD, MUSIC SEARCH PROGRAM AND RECORDING MEDIUM RECORDING MUSIC SEARCH PROGRAM

(75) Inventors: Keitaro Sugawara, Kawagoe (JP); Kensaku Yoshida, Kawagoe (JP); Takuya Tsuji, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 372 days.

(21) Appl. No.: 12/300,388

(22) PCT Filed: Apr. 18, 2007

(86) PCT No.: PCT/JP2007/058459
§ 371 (c)(1),
(2), (4) Date: Nov. 11, 2008

(87) PCT Pub. No.: WO2007/132627
PCT Pub. Date: Nov. 22, 2007

(65) Prior Publication Data
US 2009/0228475 A1 Sep. 10, 2009

(30) Foreign Application Priority Data
May 12, 2006 (JP) ................ 2006-133617

(51) Int. Cl.
*G06F 17/30* (2006.01)
(52) U.S. Cl. .................................. 707/737
(58) Field of Classification Search ............. 707/737
See application file for complete search history.

(56) References Cited

U.S. PATENT DOCUMENTS

| 2004/0193642 A1* | 9/2004 | Allen et al. ............ 707/104.1 |
| 2004/0267736 A1 | 12/2004 | Yamane et al. |
| 2006/0188109 A1 | 8/2006 | Makino et al. |

FOREIGN PATENT DOCUMENTS

| JP | 06-290574 A | 10/1994 |
| JP | 6-314302 A | 11/1994 |
| JP | 10-134549 A | 5/1998 |
| JP | 2000-155759 A | 6/2000 |
| JP | 2003-005756 A | 1/2003 |
| JP | 2004-094424 A | 3/2004 |
| JP | 2005-010771 A | 1/2005 |
| JP | 2005-038352 A | 2/2005 |

OTHER PUBLICATIONS

Wijnalda, Gertjan; "A Personalized Music System for Motivation in Sport Performance"; 2005; IEEE; 26-29.*
Junya Fukumura, et al., "Music Data Similarity Searching Method with both Filtering in Feature Space and Filtering in Melody Space," Joho Shori Gakkai Kenkyu Hokoku, Jan. 24, 2003, vol. 2003, No. 5, pp. 17-24.

* cited by examiner

Primary Examiner — Amresh Singh
(74) Attorney, Agent, or Firm — Sughrue Mion, PLLC

(57) ABSTRACT

A music search device, a music search method, a music search program, and a recording medium having the music search program recorded on it are provided. There is included a memory means for relating a music to a characteristic of the music and memorizing the music and the characteristics; a reproduction means for reproducing the music; a process means for processing the characteristic of the music thus reproduced by the reproduction means based on an instruction of a manipulation input; a characteristic detection means for detecting the characteristic of the music thus processed; and a search means for searching the music thus memorized by the memory means based on the characteristic of the music thus detected.

6 Claims, 4 Drawing Sheets

FIG.4

| BPM CLASS | BPM VALUE RANGE |
|---|---|
| 0 | ~LESS THAN 80 |
| 1 | 80 OR MORE ~ LESS THAN 100 |
| 2 | 100 OR MORE ~ LESS THAN 120 |
| 3 | 120 OR MORE ~ LESS THAN 140 |
| 4 | 140 OR MORE ~ LESS THAN 160 |
| 5 | 160 OR MORE ~ LESS THAN 180 |
| 6 | 180 OR MORE ~ |

MUSIC SEARCH SYSTEM, MUSIC SEARCH METHOD, MUSIC SEARCH PROGRAM AND RECORDING MEDIUM RECORDING MUSIC SEARCH PROGRAM

BACKGROUND OF THE INVENTION

1. Field of the Invention

The present invention belongs to the field of a music search system.

2. Discussion of Related Art

Recently, a tendency that capacity of recording medium including HD (Hard Disc) as a large-capacity memory medium, a semiconductor memory such as a flash memory, and a recording medium such as an optical disc becomes large is increasingly outstanding.

Particularly, the semiconductor memory is rapidly penetrating into the market as a so-called semiconductor audio. This is because portability of the semiconductor memory is excellent and demand for listening with a semiconductor audio becomes very high. Further, a feature of small size and large capacity advances in HDs and an HD drive with excellent portability is being supplied in the market. In such cases, users memorize music of thousands or tens of thousands in large capacity recording media such as a semiconductor memory and an HD, search, and then listen to the music which the users desire to listen to. In a case where the users search the music desired by the users among these many music compositions that are recorded in a large capacity recording medium, the users can search music compositions based on music information including an artist name, an album name, and a music name. It has not been easy to sequentially play music suitable for users' tastes, because it is required to specify a music composition from information such as an artist name, based on users' knowledge of music. As a method to solve the problem, it has been generally practiced to search music based on music impressions such as a pleasant music and a sad music (e.g. refer to the below-mentioned Patent Document 1).

Further, there include a method of selecting music that matches a melody hummed by the users, a method of selecting music that matches lyrics hummed by the users, and a method of selecting music that matches rhythm inputted by the users. (For example, vide the below-mentioned Patent Document 2.) However, it is not easy by this method to select the music the users desire to select.

Patent Document 1: Japanese Unexamined Patent Publication No. H10-134549
Patent Document 2: Japanese Unexamined Patent Publication No. H6-290574

SUMMARY OF THE INVENTION

However, according to the above-mentioned method of searching music based on music impression and the like, there is no music continuity even by continuous reproduction because of no connection by music characteristics. Further, users have only passively listened to supplied music.

Further, in the above-mentioned search method, there is a problem that the music is selected regardless of whether or not the music is suitable for the sense the users currently have because the music the users desire to listen to is required to be specified based on the users' knowledge on the music.

Therefore, an example of the object of the present invention is to provide a music search system, a music search method, a music search program, and a recording medium recording the music search program wherein the users themselves process the current music, and search the other music suitable for users' taste while confirming the process degree by their own ear.

There is provided a music search system according to claim 1 of the present invention, including:
a memory means for relating music to a characteristic of the music and memorizing these;
a reproduction means for reproducing the music;
a process means for processing the characteristic of the music thus reproduced by the reproduction means based on an instruction of a manipulation input;
a characteristic detection means for detecting the characteristic of the music thus processed; and
a search means for searching the music thus memorized by the memory means based on the characteristic of the music thus detected.

There is provided a music search method according to claim 6 of the present invention, including:
a memory step of relating music to a characteristic of the music and memorizing the music and the characteristic;
a reproduction step of reproducing the music;
a process step of processing the characteristic of the music thus reproduced in the reproduction step based on an instruction by manipulation input;
a characteristic detection step of detecting the characteristic of the music thus processed; and
a search step of searching the music thus memorized in the memory step based on the characteristic of the music thus detected.

A music search program according to claim 7 causes a computer included in a music search system to function as:
a memory means for relating music to a characteristic of the music and memorizing the music and the characteristic;
a reproduction means for reproducing the music;
a process means for processing the characteristic of the music thus reproduced by the reproduction means based on an instruction by a manipulation input;
a characteristic detection means for detecting the characteristic of the music thus processed; and
a search means for searching the music thus memorized by the memory means based on the characteristic of the music thus detected.

BRIEF DESCRIPTION OF THE DRAWINGS

FIG. 4 is a table showing an example of clustering a BPM value according to the present embodiment.

EXPLANATION OF NUMERICAL REFERENCES

1: Music characteristic detection clustering unit;
2: Music characteristic database unit;
3: Music database unit;
4: Input unit;
5: Music process unit; and
6: Music characteristic detection unit

BEST MODE FOR CARRYING OUT THE INVENTION

Next, embodiments of the present invention will be described in reference of drawings.

Figure 1:
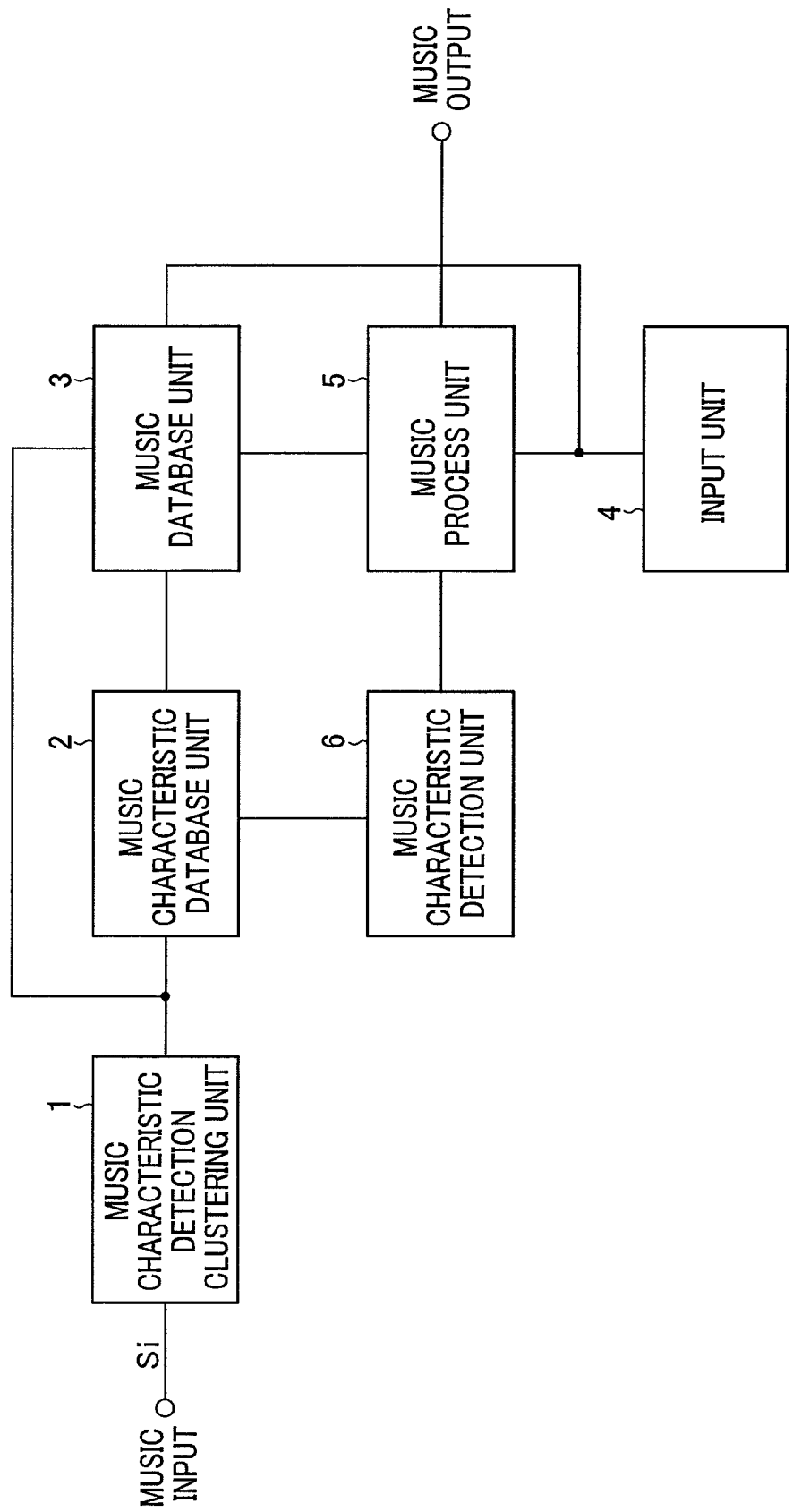
FIG. 1 is a block diagram showing an overall configuration of a music search system of an embodiment.
Figure 2:
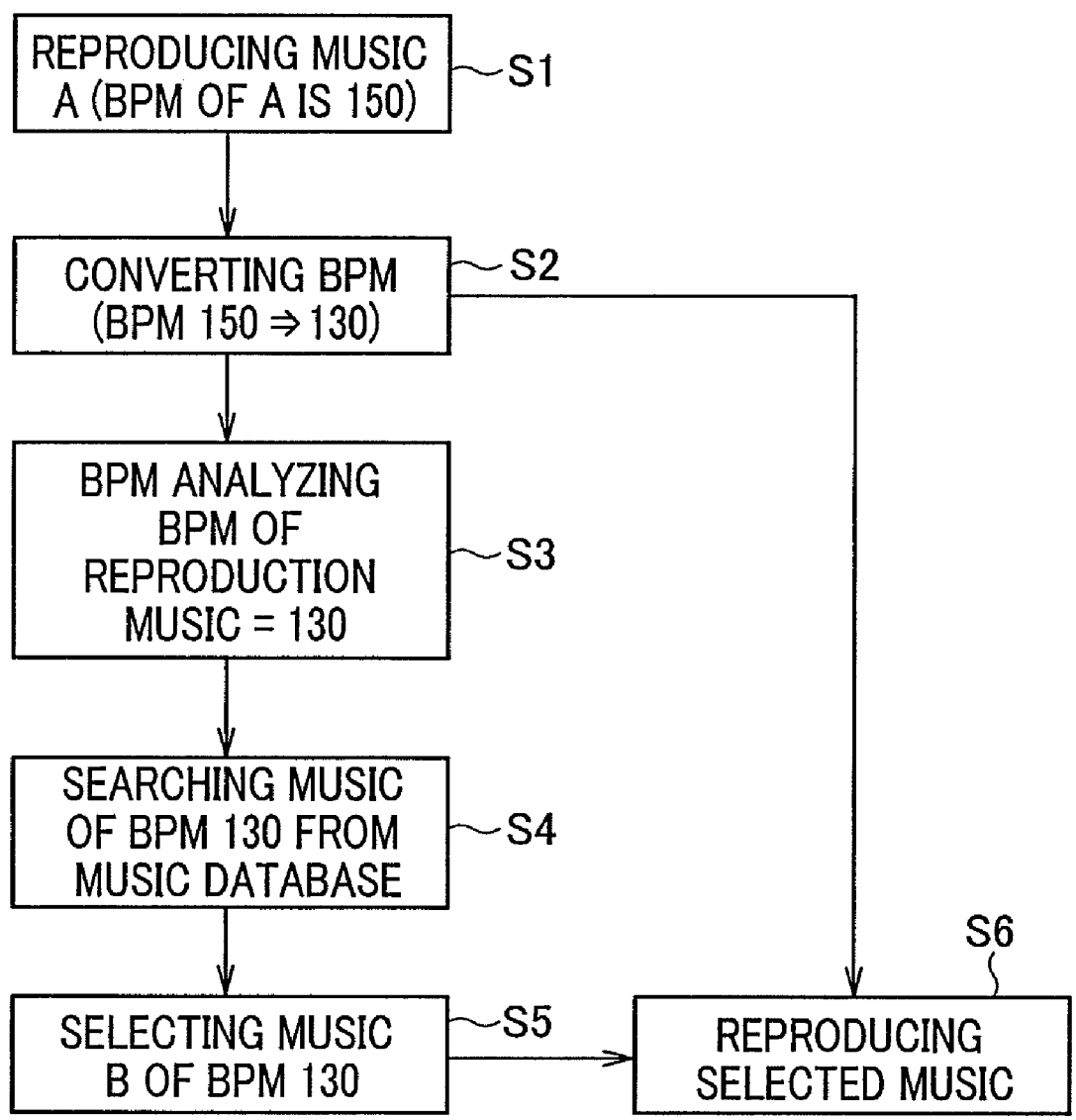
FIG. 2 is a flowchart showing an operation of a first embodiment.
Figure 3:
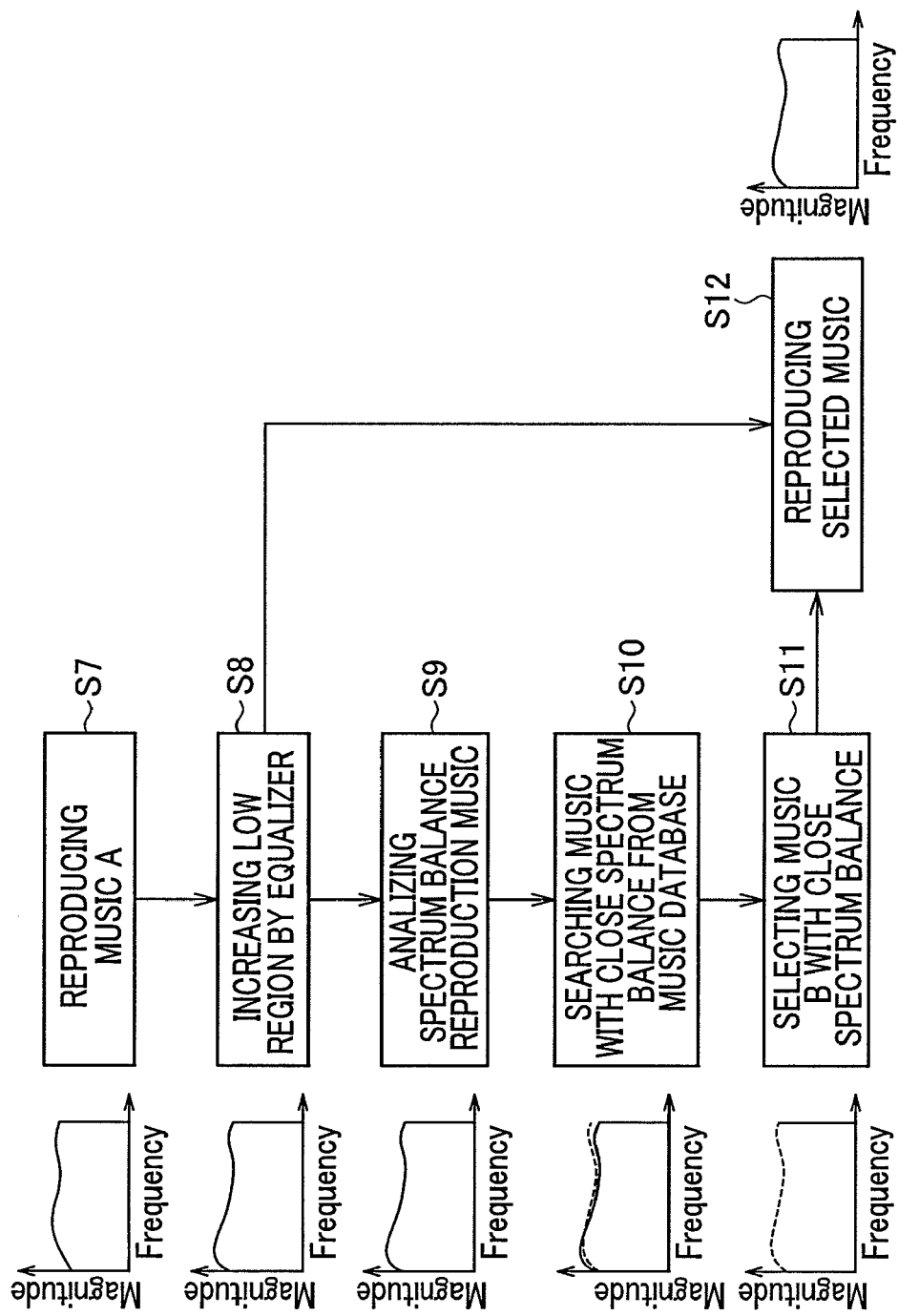
FIG. 3 is a flowchart showing a configuration of a second embodiment.

Here, FIG. 1 is a block diagram showing an example of an overall configuration of a music search system according to respective embodiments. FIG. 2 is a view of flowchart showing an operation according to the first embodiment. FIG. 3 is a view of flowchart showing an operation according to the second embodiment.

In the present invention, music resembling characteristics of music currently reproduced by users is searched and reproduced. The users themselves provide some change to the music they are currently listening to. Then the users listen to the music provided with change and judge whether or not the music tune is desired one. After they themselves confirm the music tune becomes their desired one, they search the other music to fit their desired music tune and reproduce the other music.

In the first embodiment, an embodiment wherein beats per unit time (BPM: beats per minutes) is featured as music characteristics is described. In a music search system, the users change BPM of the music they are currently listening to and search music corresponding to their desired BPM, so that they can listen to the music corresponding to their desired BPM.

In the second embodiment, an embodiment that a frequency balance is featured as music characteristic is described. In a music search system, the users change frequency balance they are currently listening to and confirm the frequency balance they desire by listening to the music with its frequency balance balanced. Subsequently, the users search music corresponding to the changed frequency balance so that they can listen to their desired music.

The frequency balance shows distribution in a frequency region of a music signal level value with respect to every frequency region predetermined.

First, overall configuration of music search system according to respective embodiments is described with reference to FIG. 1.

The music search system S according to respective embodiments is configured by a music characteristic detection clustering unit 1, a music characteristic database unit 2, a music database unit 3, an input unit 4, a music process unit 5, and a music characteristic detection unit 6.

As shown in FIG. 1, music information as a sound signal including a CD reproduction signal as an input signal Si, a DVD reproduction signal or an analog record reproduction signal is inputted in the music characteristic detection clustering unit 1.

The music characteristic detection clustering unit 1 extracts an amount of the music characteristic from the input signal Si after acquiring these input signals Si. BPM and frequency balance are cited as the music characteristic amount.

An action of extracting BPM includes an action of clustering as described below, in addition to taking BPM value of the inputted music as a music characteristic amount as-is.

For example, BPM value is divided by 20 to carry out the clustering process. Specifically, BPM value of less than 80 is set up to be BPM class 0, BPM value of over 80 to less than 100 is set up to be BPM class 1, BPM value of 100 to less than 120 is set up to be BPM class 2, BPM value of over 120 to less than 140 is set up to be BPM class 3, BPM value of over 140 to less than 160 is set up to be BPM class 4, BPM value of over 160 to less than 180 is set up to be BPM class 5, and BPM value of over 180 is set up to be BPM class 6 to cluster the extracted music.

An example of a relation between the BPM class and the BPM value that are thus clustered is shown in FIG. 4.

Specifically, in a case of an extracted music BPM value of 110, the extracted music is clustered as BPM class 2. In a case of an extracted music BPM value of 150, the extracted music is clustered as BPM class 4. These clustered BPM classes are outputted to a music characteristic database unit 2 in correspondence with music data.

Next a frequency balance is described.

The frequency region is divided into high-frequency region, middle-frequency region, low-frequency region, and the like, and the frequency balance is compared by using an average value of respective frequency regions. Further, besides the case where an average decibel value of respective frequency regions from the beginning to the last of the music as music characteristic amount is detected, only a predetermined time (e.g. for 10 seconds) of the beginning of the music is sampled and an average decibel value of respective frequency regions for 10 seconds is made as music characteristic amount.

Further, a portion so-called "sabi" where the music characteristic is most expressed is divided into respective frequency regions and music characteristic amount may be an average decibel value every frequency region as well.

Further, the method of dividing the frequency region is not limited to the case of dividing into three frequency regions such as high-frequency region, middle-frequency region and low-frequency region, but there is no limitation to the divided frequency region. Further, respective frequency regions do not need to have the same frequency band but may be divided by a different frequency band.

Further, the music characteristic detection clustering unit 1 also clusters an average decibel value of respective frequency regions into several decibel intervals.

Further, in a case where a music characteristic amount is a BPM value, the music characteristic amount may be the BPM value of 10 seconds by sampling predetermined time of the beginning of the music (e.g. 10 seconds), besides detecting the average BPM value as the music characteristic amount of the respective frequency regions from the beginning to the end of the music. Further, the music characteristic amount may be an average BPM value of a portion so called "sabi" of the music.

The music characteristic amount extracted and the music characteristic amount clustered by the music characteristic detection clustering unit 1 are outputted to the music characteristic database unit 2. Further, a music (input signal Si) inputted in the music characteristic detection clustering unit 1 is inputted in the music database unit 3 in correspondence with the music characteristic amount.

The music characteristic base unit 2 memorizes the music characteristic amount outputted from the music characteristic detection clustering unit 1, in correspondence with the music inputted in the music database unit 3.

Further, the music characteristic database unit 2 searches whether or not a music characteristic amount matching that required by a music characteristic detection unit 6 is memorized in the music characteristic database unit 2 based on the request from the music characteristic detection unit 6. In a case where a music characteristic amount corresponding to that based on the request from the music characteristic detection unit 6 is memorized, the music database unit 3 is requested to output the music memorized in the music database unit 3 corresponding to the music characteristic amount to the music process unit 5.

The music database unit 3 memorizes the music outputted from the music characteristic detection clustering unit 1 in correspondence with the music characteristic amount inputted in the music characteristic database unit 2. The music characteristic database unit 3 outputs the music corresponding to the music characteristic amount thus memorized in the music characteristic database unit 2 in response to the request from the music characteristic database unit 2, to the music process unit 5.

Further, the music database unit 3 outputs the music memorized in the music database unit 3 to the music process unit 5 based on the instruction of the input unit 4.

The input unit 4 is provided with a switch (not shown) operated by the users and further with a display unit (not shown) viewable for the users.

When the users input information specifying the music such as a music name through the switch of the input unit 4, the input unit 4 inquires to the music database unit 3 whether or not the specified music exists. In a case where the music information identified by the users exist in the music database unit 3, the music information is outputted from the music database unit 3 to the music process unit 5.

Further, the input unit 4 is provided with switches or the like used by the users for changing music characteristic amount of the music that is reproduced in the music process unit 5 and outputted out of the music detection system. These switches may be shared with switches used for specifying music information.

For example, in a case of changing a BPM value, a BPM class clustered in the music characteristic detection clustering unit 1 may be designated. Currently, in a case where a BPM class as a music characteristic amount of the music reproduced in the music process unit 5 is BPM class 2, the users may designate BPM classes 1, 3, 4, 5, and 6 through the switch of the input unit 4. Further for example in a case where BPM class 4 is once designated by the users, the users may designate BPM classes 1, 2, 3, 5, and 6 through the switch of the input unit 4 afterward. The input unit 4 outputs a value corresponding to the BPM class thus designated by the users, to the music process unit 5.

Further, the users may input instruction information for changing frequency balance in the input unit 4.

For example, in a case where the users desire to turn up the sound in a low-frequency region, the users designate the low-frequency region through the switch installed in the input unit 4. Subsequently, the sound level of the low-frequency region may be raised in units of several decibels through the switch in the input unit 4. Further, the sound level of the low-frequency region may be raised in clustered units (predetermined decibel value) through the switch in the input unit 4. The input unit 4 outputs to the music process unit 5 the frequency region designated by the users and the decibel value to be raised. Further, the users may freely lower the decibel value that has once been raised and freely raise the decibel value through the switch in the input unit 4. Further, the users may freely designate the frequency region. Such the frequency region indicates the frequency region divided in the music characteristic detection clustering unit 1.

Accordingly, the users may freely change the music currently reproduced through the input unit 4.

In a case where the users judge that the music currently reproduced changes to the music tune of their taste, when desiring to listen to the other music similar to the music tune, the users may cause the music characteristic database unit 2 to start searching the other music through the switch of the input unit 4. In such case, the input unit 4 outputs to the music process unit 5 the instruction order to search the other music similar to the music characteristic of the music currently reproduced, from the music database unit 3.

The music characteristic amount and the music characteristic amount change unit that can be designated in the input unit 4 correspond to the music characteristic amount and the music characteristic amount clustering value that are extracted, in the music characteristic clustering unit 1.

Next, the music process unit 5 is described.

The music process unit 5 searches the music from the music database unit 3 and reproduces thus searched music and outputs it to the outside. Besides, the music process unit 5 functions to change the music characteristic amount of the music and reproduce the music changing the music characteristic amount and output it to the outside based on the instruction from the input unit 4.

The music process unit 5 searches the music specified by the instruction from the input unit 4, from the music database unit 3, based on the instruction from the input unit 4. When the search finishes, the music process unit 5 reproduces thus specified music based on the instruction from the input unit 4, and further stops and finishes reproduction.

Further, the music characteristic amount of the reproduced music is changed based on an instruction from the input unit 4.

For example, in a case where a BPM value of the music currently reproduced is 110, a BPM class of this music corresponds to the BPM class 2. In this case, when the music process unit 5 receives an order from the input unit 4 to change the BPM class of the music reproduced in the music process unit 5 to a BPM class 3, the music process unit 5 increases the reproduction speed of the music currently reproduced, to adjust reproduction speed to make the BPM value the BPM class 3. Specifically, the reproduction speed of the music is increased from BPM value 110 up to the BPM value of about 130 that is included in the BPM class 3. Then the music process unit 5 reproduces the music with the changed BPM value of 130 and outputs outside.

Further, in a case where the BPM value of the music currently reproduced is 110, when the music process unit 5 receives an order from the input unit 4 to change the BPM class of the reproduced music to the BPM class 1, the music process unit 5 decreases the reproduction speed of the music currently reproduced, to adjust the reproduction speed to make the BPM value the BPM class 1. Specifically, the reproduction speed of the music is decreased from BPM value 110 up to the BPM value of about 90 that is included in the BPM class 1. Then the music process unit 5 reproduces the music with the changed BPM value of 90 and outputs outside.

Further, when receiving an instruction order from the input unit 4 to search the other music of the same BPM class as the BPM class of the music currently reproduced, the music process unit 5 outputs an instruction order to detect the music characteristic amount of the music currently reproduced to the music characteristic detection unit 6. Then the music process unit 5 outputs a search instruction order to the music characteristic database unit 2 to search the music having the music characteristic amount belonging to the same cluster as that of the music characteristic amount thus detected in the music characteristic detection unit 6.

Further, for example, when receiving an instruction from the input unit 4 to increase an average decibel value in the low-frequency region of the music currently reproduced by 3 dB, the music process unit 5 increases the amplification degree of the music currently reproduced to increase the amount corresponding to 3 dB as the decibel value.

Further, when receiving an instruction from the input unit 4 to decrease an average decibel value in the low-frequency region of the music currently reproduced by 3 dB, the music process unit 5 decreases the amplification degree of the music currently reproduced to decrease the amount corresponding to 3 dB as the decibel value.

Further, in a case where the frequency region is in the middle-frequency region or high-frequency region, the music process unit 5 increases or decreased the amplification degree of the amplifier to increase or decrease decibel values of the respective frequency regions in response to respective frequency regions. Such the operations are similar to those of a so-called equalizer.

Further, when receiving an instruction order from the input unit 4 to search the music having the same music characteristic amount as that of the music currently reproduced, the music process unit 5 outputs an instruction order to detect the music characteristic amount of the music currently reproduced to the music characteristic detection unit 6. Then the music characteristic detection unit 6 outputs a search instruction order to the music characteristic database unit 2 to search the music having the music characteristic amount belonging to the same cluster as that of the detected music characteristic amount.

Next the music characteristic detection unit 6 is described.

The music characteristic detection unit 6 detects the music characteristic amount of the music reproduced in the music process unit 5 through the music process unit 5 based on an instruction of the input unit 4.

The users can instruct which part of the music to be searched the music characteristic amount of the music reproduced in the music process unit 5 corresponds to. For example, when the music reproduced in the music process unit 5 belongs to the BPM class 2, the users can instruct the input unit 4 to search the other music having the BPM value, for the predetermined period (about 10 seconds) from start of the other music, corresponds to the BPM class 2. Further, the users can instruct the input unit 4 to search the other music having the BPM value during a portion of so-called "sabi" of the other music, corresponds to the BPM class 2. Further, the users can instruct to search the other music having an overall music average BPM value of the other music corresponds to the BPM class 2.

Further, for example, the users can instruct to search the music exists within a range where average signal strength (decibel value) respectively in low-frequency region, middle-frequency region and high-frequency region of the music reproduced in the music process unit 5 is predetermined (within a clustered range). Specifically, the music characteristic database unit 2 extracts from the music database unit 3 the music having frequency distribution (spectrum balance) corresponding to the strength (decibel value) range of the low-frequency region of the music currently reproduced, the strength (decibel value) range of the middle-frequency region of the music currently reproduced, or the strength (decibel value) range of the high-frequency region of the music currently reproduced. The users can instruct the input unit 4 to search the other music existing within a range where the average signal strength in respective frequency regions for the predetermined period (about 10 seconds) from the start of the other music is predetermined.

Further, the users can instruct the input unit 4 to search the other music within the level region where the average signal strength in respective frequency regions for the period of a portion of the so-called "sabi" of the other music is predetermined. Further, the users can instruct to search the other music within the region where the average signal strength in respective frequency regions in the entire music of the other music is predetermined.

Accordingly, the users can judge only by their ears whether or not the music is the one they want to listen to because the users can process the current music and search the music that is suitable for their taste. That means it is possible to research and select the music tune that cannot be expressed by words.

Further, it is possible to feel pleasant without feeling trouble with music selection because the users can always confirm their own taste while listening to the music.

Next, an operation according to the first embodiment is described based on a flowchart shown in FIG. 2.

In Step S1, the users select the music they desire to listen to through the input unit 4. Then the music designated by the users is extracted from the music database unit 3 to the music process unit 5, and the music designated by the users is reproduced by the music process unit 5. The users listen to the music designated by the user from loudspeakers such as a headphone and a speaker that are connected to the music process unit 5. Next the process goes to Step S2.

In Step S2, in a case where the BPM value of the music designated by the users is 150 and the users desirer slower music (tempo), the users designate the BPM value as 130 through the input unit 4. Then the music process unit 5 processes the BPM value of the music currently reproduced into 130 and reproduces the music with the BPM value thus processed into 130. The users may further change a tempo of the music thus reproduced. Further, in a case where the users appreciate the tempo of the music currently reproduced and desire to listen to the other music corresponding to the tempo of the music currently reproduced, the users go to Step S3.

In Step S3, the music characteristic detection unit 6 analyzes the music characteristic amount of the music reproduced in the music process unit 5. In this case, the music characteristic detection unit 6 analyzes a number of the BPM value of the music reproduced in the music process unit 5. Thus, the music characteristic detection unit 6 recognizes that the BPM value of the reproduced music is 130. Next the process goes to Step S4.

In Step S4, the music characteristic database unit 2 searches the music with the BPM value of 130 based on the instruction from the music characteristic detection unit 6. In this case, only music pieces where the BPM value does not necessarily match 130 are memorized in the music characteristic database unit 2 in some cases. In such cases, the music existing in the BPM class 3 is searched.

Further, as described before, the users may limit the BPM value enabled to be instructed from the input unit 4 in BPM classes. Next the users go to Step S5.

In Step S5, the music characteristic database unit 2 selects the music corresponding to the music with BPM value of 130 thus memorized in the music characteristic database unit 2, from the music database unit 3. In the music characteristic detection clustering unit 1, the users may search and select the music corresponding to thus searched music characteristic amount, from the music database unit 3, based on the relation information between the music characteristic amount and the music that are previously correlated. Next the users go to Step S6.

In Step S6, the music process unit 5 reproduces thus selected music. Further in a case where plural pieces of the music corresponding to the searched music characteristic amount exist in the music characteristic extraction unit 2, the users may select the next music through the input unit 4 and reproduce the next music in the music process unit 5.

Next, an operation according to Embodiment 2 is described based on a flowchart shown in FIG. 3.

In Step S7, the users select the music they desire to listen to through the input unit 4. Then the music designated by the users is extracted from the music database unit 3 into the music process unit 5, and the music designated by the users is reproduced by the music process unit 5. The users listen to the music they designate from loudspeakers such as a headphone and a speaker connected to the music process unit 5. Next, the process goes to Step S8.

In Step S8, in a case where the users desire to increase a level of low-frequency region of the music currently reproduced, the users instruct to increase the level of the low-frequency region by predetermined unit (e.g. 3 dB unit or a clustered unit) through the input unit 4. Then, the music process unit 5 increases the amplification degree of the low-frequency region (operating equalizing) to increase the low-frequency region level of the music currently reproduced, by amount based on the instruction from the input unit 4. The users may further change a spectrum balance of the reproduced music. Further, in a case where the users appreciate the spectrum balance of the music currently reproduced and desire to listen to the other music corresponding to the spectrum balance of the music currently reproduced, the users then go to Step S9.

In Step S9, the music characteristic detection unit 6 analyzes the music characteristic amount of the music reproduced in the music process unit 5. In this case, the music characteristic detection unit 6 analyzes the number of the average dB value in the low-frequency region of the music reproduced in the music process unit 5. Thus, the music characteristic detection unit 6 recognizes the number of the decibel value in the low-frequency region of the reproduced music. Further, with respect to the other frequency region, the music characteristic detection unit 6 analyzes the average dB value of the decibel (dB) value expressing the sound amount of the respective frequency regions. Next, the process goes to Step S10.

In Step S10, the music characteristic database unit 2 searches the music that matches the spectrum balance analyzed by the music characteristic extraction unit 6 in Step S9, based on the instruction of the music characteristic detection unit 6. Here, the spectrum balance matching the spectrum balance analyzed in Step S9 is not necessarily memorized in the music characteristic database unit 2 in some cases. In such the case, the matching spectrum balance in the level region classified by frequency region (expressing a range of predetermined decibel value) is searched.

In Step S11, the music characteristic database unit 2 selects the music with spectrum balance corresponding to the music analyzed in the music characteristic detection unit 6 in Step S9, from the music database unit 3. In the music characteristic detection clustering unit 1, the users may search and select the music corresponding to thus searched music characteristic amount, from the music database unit 3, based on the relation information between the related music characteristic amount and the music. The users go to Step S12.

In Step S12, the music process unit 5 reproduces thus selected music. Further, in a case where plural pieces of the music corresponding to the music characteristic amount thus searched in the music characteristic database unit 2 exist in the music database unit 3, the users may select the next music through the input unit 4 and reproduce the next music in the music process unit 5.

According to the present embodiment, the users are enabled to process the current music by users themselves and automatically search the other music suitable for their taste while confirming the process degree by their ears.

Therefore, the users are enabled to actively search the well-connected music that is suitable for the current sense of the users based on the result that the users actively process (adjust) the music.

Further, the users are enabled to consequently reproduce the music they desire to listen to because well-connected music is the music that standardizes modulation parameters selected by the users and auditory connection for the users are created in the previous or next music.

According to the present embodiment, the users are enabled to receive a sense of connecting music pieces as a service because the other music is automatically searched based on the music the users actively adjust.

According to the present embodiment, the users are enabled to judge only by ear whether or not it is the music the users desire to listen to because the users are enabled to process the current music and search the music suitable for the their taste. In other words, the users are enabled to research and select the music tune that cannot be expressed by words. Further, the users are enabled to feel pleasant without feeling trouble with selection work because the users always confirm their taste while listening to the music.

Further, a display screen becomes unnecessary because it is possible to search the music only by counting on the ear. Accordingly, the users operate a switch at hand without watching the display screen in crowded vehicles such as trains and buses, and listens to and confirms the music processed and reproduced based on thus operated switch. Therefore, the users can enjoy to listen to the music they process into their favorite music tune. Further, the users are enabled to easily search the other music suitable for their favorite music tune only by pushing the switch at hand.

Further in a case where the users cannot remember the specific artist name or album name, nor express the music image by using adjectives such as pleasant music or sad music, the users are enabled to create and confirm the music by listening to the music processed by themselves by their ears. Further, the users are enabled to search the music suitable for the image by ear.

In some cases, it is not in a situation that users desire to listen to given specific music among many recorded music pieces. In some cases, the users desire to listen to "this" sort of music. In other cases, the image of "this" sort that the users think cannot be expressed only by words. Therefore, according to the present invention, the music currently reproduced is processed as a method of expressing "this" sort that the users think as an image. The users process the music to express the taste of users themselves and extract the music characteristic suitable for their taste, and therefore the users are enabled to easily search the music suitable for the users themselves.

Although, in the present invention, the BPM value and the spectrum balance are explained as the music characteristic amount, the music characteristic amount is not limited thereto. For example, sound tone information may be used as the music characteristic amount. Specifically, a reverberation property can be specified as the music characteristic amount. Further, it may be a criterion of whether or not the music has a tone of piano as a music characteristic amount.

Further, programs corresponding to the flowcharts in FIGS. 2 and 3 are previously recorded in an information recording medium or previously recorded through network such as internet and the like, and these are read out by a general-purpose microcomputer or the like and carried out. Then it is possible to cause the general-purpose microcomputer or the like to function as a CPU related to the embodiments.

What is claimed is:
1. A music search apparatus, comprising:
a music and music characteristic database unit that relates music to a characteristic of the music and memorizes the music and the characteristics;

wherein the music search apparatus comprises a processor coupled to a memory storing the music and music characteristic database unit;

a reproducer that reproduces the music;

a music process unit that changes the music characteristic amount of the music currently reproduced by the reproducer based on an instruction of a manipulation input and the music currently reproduced;

a characteristic detector that detects the music characteristic amount of the music thus changed;

while the music is currently reproduced, a search unit that, after the music characteristic amount of the music currently reproduced is changed by the music process unit, and detected by the characteristic detector, searches the music memorized by the music and music characteristic database unit based on the changed music characteristic amount of the music thus detected, wherein the reproducer reproduces the music searched by the search unit following the music currently reproduced, and wherein the reproducer reproduces the currently reproduced music based on the music characteristic amount of the music changed by the music process unit.

2. The music search apparatus according to claim 1, wherein the characteristic of the music thus memorized by the music and music characteristic database unit is divided by at least not less than two ranges predetermined by a type of the music characteristic.

3. The music search apparatus according to claim 1, wherein the characteristic of the music includes at least one of an average value for an overall period of the music, an average value for a period of predetermined time from start of the music, and an average value of a characteristic portion of the music.

4. The music search apparatus according to claim 1, wherein the characteristic of the music includes at least beats per unit time or frequency balance.

5. A music search method, comprising:

a memory step of relating music to a characteristic of the music and memorizing the music and the characteristics;

a reproduction step of reproducing the music;

a process step of changing the music characteristic amount of the music thus reproduced in the reproduction step based on an instruction by manipulation input and the music currently reproduced;

a characteristic detection step of detecting the music characteristic amount of the music thus changed;

while the music is currently reproduced, a search step of, after the music characteristic amount of the music currently reproduced is changed by the music process unit, and detected by the characteristic detector, searching the music thus memorized in the memory step based on the changed music characteristic amount of the music thus detected, and reproducing the music searched by the search step following the music currently reproduced;

wherein the currently reproduced music is reproduced based on the music characteristic amount of the music changed by the process step.

6. A music search computer program embodied in a non-transitory computer-readable medium and representing a sequence of instructions, which when executed by a computer, the instructions cause the computer to function as:

a music and music characteristic database unit that relates music to a characteristic of the music and memorizes the music and the characteristics;

a reproducer that reproduces the music;

a music process unit that changes the music characteristic amount of the music currently reproduced by the reproducer based on an instruction by a manipulation input and the music currently reproduced;

a characteristic detector that detects the music characteristic amount of the music thus changed; and while the music is currently reproduced, a search unit that, after the music characteristic amount of the music currently reproduced is changed by the music process unit, and detected by the characteristic detector, searches the music memorized by the music and music characteristic database unit base on the changed music characteristic amount of the music thus detected, wherein the reproducer reproduces the music searched by the search unit following the music currently reproduced, and wherein the reproducer reproduces the currently reproduced music based on the music characteristic amount of the music changed by the music process unit.

* * * * *